United States Patent
Zhang et al.

(10) Patent No.: US 12,167,460 B2
(45) Date of Patent: Dec. 10, 2024

(54) RESOURCE INDICATION IN RANDOM ACCESS

(71) Applicant: ZTE Corporation, Guangdong (CN)

(72) Inventors: Junfeng Zhang, Guangdong (CN); Wei Gou, Guangdong (CN); Zhihong Qiu, Guangdong (CN); Yuzhou Hu, Guangdong (CN); Li Tian, Guangdong (CN)

(73) Assignee: ZTE Corporation, Shenzhen (CN)

( * ) Notice: Subject to any disclaimer, the term of this patent is extended or adjusted under 35 U.S.C. 154(b) by 599 days.

(21) Appl. No.: 17/505,525

(22) Filed: Oct. 19, 2021

(65) Prior Publication Data
US 2022/0046717 A1 Feb. 10, 2022

Related U.S. Application Data

(63) Continuation of application No. PCT/CN2019/085301, filed on Apr. 30, 2019.

(51) Int. Cl.
*H04W 74/0833* (2024.01)
*H04L 1/1829* (2023.01)
*H04L 5/00* (2006.01)

(52) U.S. Cl.
CPC ............... *H04W 74/0833* (2013.01)

(58) Field of Classification Search
None
See application file for complete search history.

(56) References Cited

U.S. PATENT DOCUMENTS

| | | | |
|---|---|---|---|
| 10,034,308 B2 | 7/2018 | Lee et al. | |
| 10,673,576 B2* | 6/2020 | Um | H04L 1/18 |
| 10,925,037 B2* | 2/2021 | Gao | H04B 7/26 |
| 11,102,825 B2 | 8/2021 | Chen et al. | |
| 11,271,699 B1* | 3/2022 | Eyuboglu | H04L 25/0226 |
| 11,368,974 B2* | 6/2022 | Cai | H04L 5/0094 |
| 2013/0157669 A1 | 6/2013 | Turtinen et al. | |
| 2017/0019882 A1 | 1/2017 | Nimbalker et al. | |
| 2017/0180098 A1* | 6/2017 | You | H04W 74/04 |
| 2018/0103465 A1 | 4/2018 | Agiwal et al. | |

(Continued)

FOREIGN PATENT DOCUMENTS

| | | |
|---|---|---|
| CN | 101682591 A | 3/2010 |
| CN | 103220691 A | 7/2013 |

(Continued)

OTHER PUBLICATIONS

Nokia, "On 2-step RACH Procedure", 3GPP TSG RAN WG1 #96bis, (Year: 2019).*

(Continued)

*Primary Examiner* — Jeffrey M Rutkowski
*Assistant Examiner* — Ning Li
(74) *Attorney, Agent, or Firm* — Perkins Coie LLP

(57) ABSTRACT

One example method for indication of resources in a random-access procedure includes receiving, by a communication device, during a process of a two-step random access to a wireless network, a message including a temporary identifier assigned to the communication device, and transmitting, by the communication device, an acknowledgement message to a network device in the wireless network using a transmission resource that is dependent on the temporary identifier.

24 Claims, 8 Drawing Sheets

(56) References Cited

U.S. PATENT DOCUMENTS

| | | | |
|---|---|---|---|
| 2018/0110075 A1 | 4/2018 | Ly et al. | |
| 2018/0124822 A1 | 5/2018 | Wang et al. | |
| 2018/0146498 A1 | 5/2018 | Sahlin et al. | |
| 2018/0324786 A1* | 11/2018 | Hooli | H04W 72/02 |
| 2018/0324863 A1 | 11/2018 | Akoum et al. | |
| 2019/0334687 A1* | 10/2019 | Su | H04L 5/0053 |
| 2020/0045742 A1 | 2/2020 | Suzuki et al. | |
| 2021/0007139 A1* | 1/2021 | Fu | H04L 5/0053 |
| 2021/0068148 A1* | 3/2021 | Yamamoto | H04W 74/006 |
| 2021/0136804 A1* | 5/2021 | Qian | H04W 52/146 |
| 2022/0060293 A1* | 2/2022 | Matsumura | H04L 1/1896 |
| 2022/0086824 A1* | 3/2022 | Kundu | H04L 5/0053 |

FOREIGN PATENT DOCUMENTS

| | | |
|---|---|---|
| CN | 106105366 A | 11/2016 |
| CN | 108282901 A | 7/2018 |
| CN | 109644503 A | 4/2019 |
| EP | 2845406 A2 | 3/2015 |
| EP | 3451725 A1 | 3/2019 |
| IN | 201847020227 A | 6/2018 |
| WO | 2010121446 A1 | 10/2010 |
| WO | 2017186003 A1 | 11/2017 |
| WO | 2018135631 A1 | 7/2018 |

OTHER PUBLICATIONS

Chinese office action issued in CN Patent Application No. 201980095942.3, dated Jan. 5, 2024, 16 pages. English translation included.

Huawei et al., "Two-step RACH procedure for NR-U," 3GPP TSG-RAN WG2 Meeting #104, R2-1816617, Spokane, USA, Nov. 12-16, 2018, 4 pages.

Intel Corporation, "2-Step random access procedure in NR," 3GPP TSG-RAN WG2 #96, R2-168520, Reno, Nevada, USA, Nov. 14-18, 2016, 4 pages.

Mediatek Inc., "2-step RACH msgB addressing and HARQ," 3GPP TSG-RAN WG2 Meeting #104, R2-1816687, Spokane, US, Nov. 12-16, 2018, 5 pages.

International Search Report and Written Opinion mailed on Feb. 1, 2020 for International Application No. PCT/CN2019/085301, filed on Apr. 30, 2019 (6 pages).

Chinese Notification to Complete Formalities of Registration issued in CN Patent Application No. 201980095942.3, dated Mar. 7, 2024, 7 pages. English translation included.

European Communication under Rule 71(3) EPC issued in EP Patent Application No. 19927459.8, dated Apr. 2, 2024, 38 pages.

European Communication under Rule 71(3) EPC issued in EP Patent Application No. 19927459.8, dated Nov. 10, 2023, 38 pages.

European Search Report for EP Patent Application No. 19927459.8, dated Apr. 12, 2022, 10 pages.

Nokia et al., "On 2-step RACH Procedure," 3GPP TSG RAN WG1 #96bis, R1-1904716, Xi'an, China, Apr. 8-12, 2019, 16 pages.

* cited by examiner

| | |
|---|---|
| RB9 | r=8,CS=0;r=9,CS=3 | r=0,CS=0;r=1,CS=3 |
| RB8 | r=10,CS=0;r=11,CS=3 | r=2,CS=0;r=3,CS=3 |
| RB7 | r=12,CS=0;r=13,CS=3 | r=4,CS=0;r=5,CS=3 |
| RB6 | r=14,CS=0;r=15,CS=3 | r=6,CS=0;r=7,CS=3 |
| RB5 | | |
| RB4 | | |
| RB3 | r=6,CS=0;r=7,CS=3 | r=14,CS=0;r=15,CS=3 |
| RB2 | r=4,CS=0;r=5,CS=3 | r=12,CS=0;r=13,CS=3 |
| RB1 | r=2,CS=0;r=3,CS=3 | r=10,CS=0;r=11,CS=3 |
| RB0 | r=0,CS=0;r=1,CS=3 | r=8,CS=0;r=9,CS=3 |

2 symbols

FIG. 3

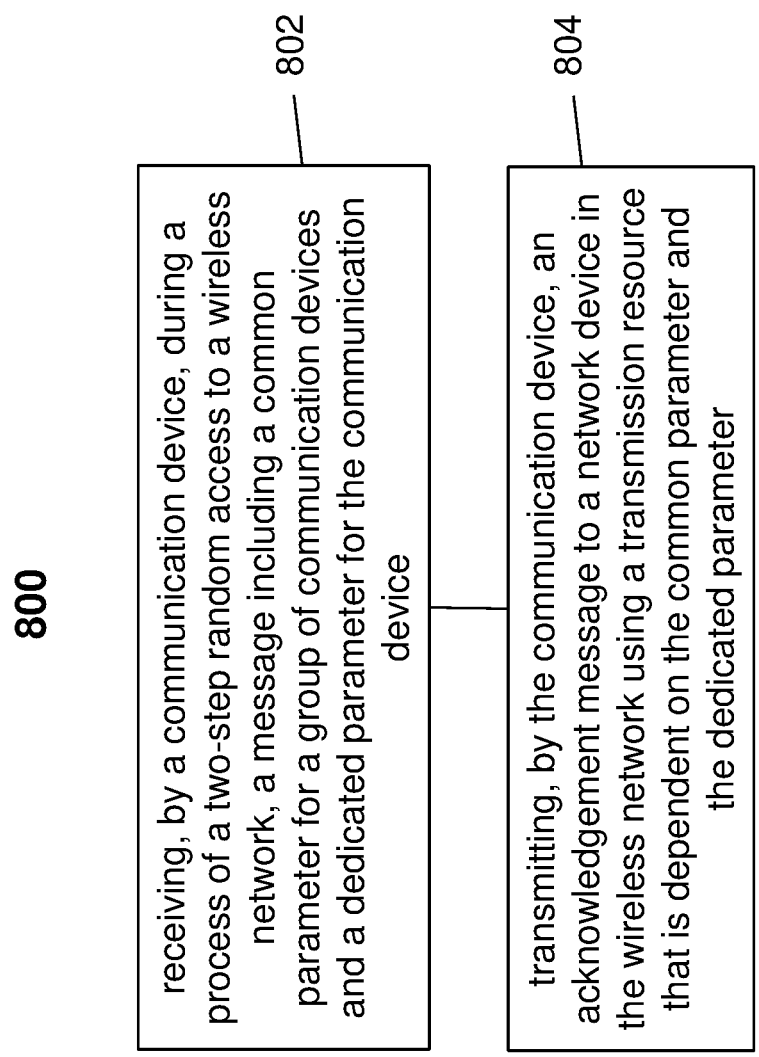

RESOURCE INDICATION IN RANDOM ACCESS

CROSS-REFERENCE TO RELATED APPLICATIONS

This application is a continuation of International Patent Application No. PCT/CN2019/085301, filed on Apr. 30, 2019, the contents of which are incorporated herein by reference in their entirety.

TECHNICAL FIELD

This disclosure is directed generally to wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

The present document uses techniques that may be used by embodiments of wireless communication devices and network devices to improve performance of a two-step random access process.

In one example aspect, a method of wireless communication is disclosed. The method includes receiving, by a communication device, during a process of a two-step random access to a wireless network, a message including a temporary identifier assigned to the communication device, and transmitting, by the communication device, an acknowledgement message to a network device in the wireless network using a transmission resource that is dependent on the temporary identifier.

In another example aspect, another method of wireless communication is disclosed. The method includes transmitting, by a network device, during a process of a two-step random access by a communication device to a wireless network, a message including a temporary identifier assigned to the communication device and receiving, by the network device, an acknowledgement message from the communication device on a transmission resource that is dependent on the temporary identifier.

In yet another example aspect, another method of wireless communication is disclosed. The method includes receiving, by a communication device, during a process of a two-step random access to a wireless network, a message including a common parameter for a group of communication devices and a dedicated parameter for the communication device and transmitting, by the communication device, an acknowledgement message to a network device in the wireless network using a transmission resource that is dependent on the common parameter and the dedicated parameter.

In yet another example aspect, a wireless communication apparatus is disclosed. The apparatus includes a processor that is configured to implement a method described herein.

In yet another example aspect, a computer-readable medium is disclosed. The computer-readable medium is used for storing code for implementing one of the above-described methods.

These, and other, aspects are described in the present document.

BRIEF DESCRIPTION OF THE DRAWING

FIG. 3 shows an example of transmission resource assignment.

FIG. 8 is a flowchart for another example method of wireless communication.

DETAILED DESCRIPTION

Section headings are used in the present document only for ease of understanding. Embodiments described in a section are not limited only to the section and can be combined with embodiments described in other sections. Furthermore, examples of Third Generation Partnership Project (3GPP) protocol are used for illustrative purpose only, and the disclosed techniques may be implemented in a wireless communication system that uses other communication protocols. For example, the terms uplink and downlink are used to indicate transmissions directions to the network and from the network.

For some applications of upcoming next generation wireless protocols, ultra-low latency is desirable. Such applications include vehicle to vehicle communication, e.g., as used for autonomous vehicle driving, or virtual reality or gaming experience. For example, a latency of less than 2 to 5 milliseconds is desirable in the radio access network (RAN) portion.

The traditional contention-based RACH procedure for Long Term Evolution/New Radio (LTE/NR) is the four-step RACH, but two-step RACH can significantly reduce the overall initial access latency, the benefit of two-step RACH is gotten more attention recently. The msgA of two-step RACH merges the equivalent content of msg1 and msg3 of four-step RACH, and msgB of two-step RACH merges the equivalent content of msg2 and msg4.

Figure 1:
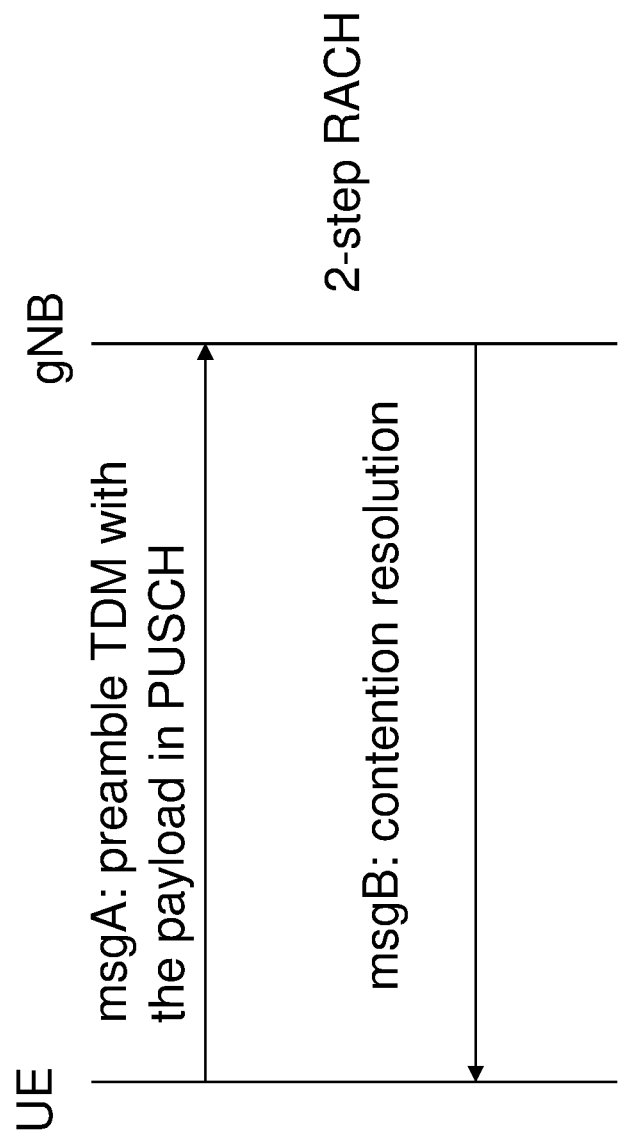
FIG. 1 shows an example signal exchange during a 2-step random access procedure.

An example of a two-step RACH process is illustrated in FIG. 1. The procedure consists of two message transmissions. The first message, called msgA, is transmitted from a wireless device (e.g., user equipment UE) to a network device (e.g., to gNodeB). The second message, called msgB, is transmitted from the network device to the wireless device. The transmission structure of msgA is a preamble and a physical uplink shared channel (PUSCH) carrying payload which includes at least the content of msg3 in the traditional 4-step RACH. MsgB content may include the equivalent contents of msg2 and msg4 of 4-step RACH and handle the contention resolution function for 2-step RACH.

Upon receiving the msgA, the gNB sends msgB, in a dedicated downlink (DL) control channel (e.g., physical downlink control channel PDCCH) and/or a shared downlink control channel (e.g., physical downlink shared channel PDSCH). Given that multiple UEs may transmit preambles of msgA in the same uplink (UL) ROs (RACH occasions), the msgB transmitted from gNB in DL is addressed to multiple UEs which shared the same UL RO. Thus, the current msgB for group UEs is similar to the msg2 for group UEs in 4-step RACH. Similar to LTE, to save the PDCCH/PDSCH resources, the RARs (random access response) for multiple UEs can be multiplexed in one medium access control protocol data unit (MAC PDU) in msgB.

In traditional 4-step RACH procedure, a UE transmits hybrid automatic repeat request (HARQ) ACK feedback for the msg4 PDSCH. A PUCCH resource set is provided by pucch-ResourceCommon signaled in system information through an index to a row of Table 9.2.1-1 in 3GPP specification 28.213 for transmission of HARQ-ACK information on PUCCH in an initial UL BWP of $N_{BWP}^{size}$ physical resource blocks (PRBs). The UE determines a PUCCH resource within the provided PUCCH resource set which has 16 PUCCH resources based on the PUCCH resource indicator field in the DCI scheduling msg4, and the starting control channel element (CCE) index of the corresponding PDCCH as well. The downlink control information (DCI) provides additional timing information through parameter PDSCH-to-HARQ_feedback timing indicator, which determines the slot of the PUCCH resource.

But the traditional procedure described in the previous paragraph only determines a single PUCCH resources based on higher layer parameters and information provided in the DCI scheduling the contention resolution message. In 2-step RACH, the msg4 function is merged into the msgB with the tradition msg2. The traditional msg2 is for group UE share the same RO, and traditional msg4 is only for one specific UE, contention resolution ID is included in the tradition msg4. As msgB of two-step RACH merges the equivalent content of msg2 and msg4, the msgB is for group UE and for specific UE both, the DCI of msgB addressed to the RA-RNTI is applied for group UEs, but the contention resolution ID in RAR in msgB is just for specific UE. RARs of multiple UEs are multiplexed in one MAC PDU in msgB and sent to multiple UEs together in one PDSCH. One technical problem that exists, and thus needs to be solved, for 2-step RACH UE is that the UE in groups which successfully decoding the corresponding RAR in msgB and getting its contention resolution ID need to determine a unique PUCCH resource for itself to feedback its HARQ-ACK to gNB, the unique PUCCH resource for each UE in group will enable the gNB to determine which UE successfully received its RAR in msgB. The present day techniques cannot provide the unique PUCCH resource for multiple UEs as the PUCCH resource is determined by the explicit or implicit parameters in the DCI which is for all UEs in group. The techniques and embodiments described in the present document can be used to overcome these technical problems, among others.

Figure 6:
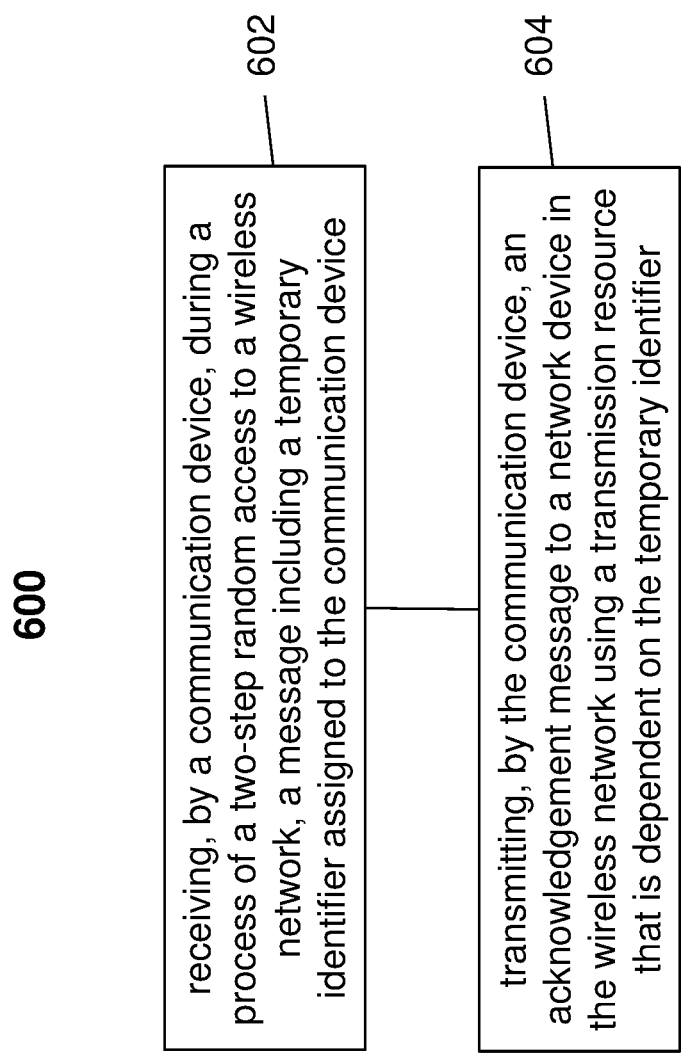
FIG. 6 is a flowchart of an example method of wireless communication.

FIG. 6 is a flowchart for a method 600 that may be performed by a wireless device. The method 600 includes receiving, by a communication device, during a process of a two-step random access to a wireless network, a message including a common parameter for a group of communication devices and a dedicated parameter for the communication device.

The method 600 includes transmitting, by the communication device, an acknowledgement message to a network device in the wireless network using a transmission resource that is dependent on the common parameter and the dedicated parameter.

Figure 7:
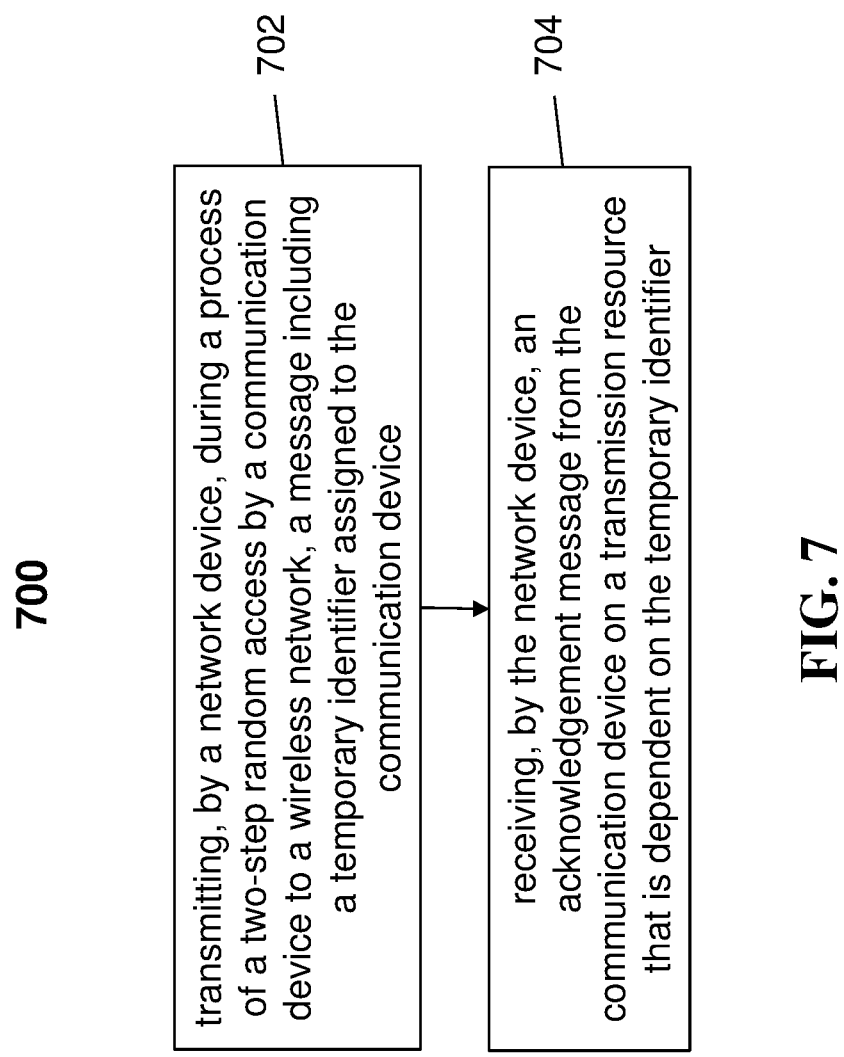
FIG. 7 is a flowchart for another example method of wireless communication.

FIG. 7 is a flowchart of a method 700 of wireless communication. The method 700 may be implemented by a network device such as the gNB. The method 700 includes transmitting, by a network device, during a process of a two-step random access by a communication device to a wireless network, a message including a temporary identifier assigned to the communication device.

The method 700 includes receiving, by the network device, an acknowledgement message from the communication device on a transmission resource that is dependent on the temporary identifier.

FIG. 8 is a flowchart for an example method 800 of wireless communication. The method 800 includes receiving, by a communication device, during a process of a two-step random access to a wireless network, a message including a common parameter for a group of communication devices and a dedicated parameter for the communication device.

The method 800 includes transmitting, by the communication device, an acknowledgement message to a network device in the wireless network using a transmission resource that is dependent on the common parameter and the dedicated parameter.

In the methods 600, 700 and 800, the communication device may be UE such as a mobile phone, a laptop, a tablet, an Internet of Things (IoT) device, or another hardware platform capable of wireless transmission and reception.

In the context of 5G protocols, the message described in 600, 700, 800 may be msgB as is described further in the present document.

Additional features of these methods are described with reference to example embodiments below. As described in the example embodiments, one example of the temporary identifier is a cell radio network temporary identifier (C-RNTI).

Example Embodiment 1

Figure 2:
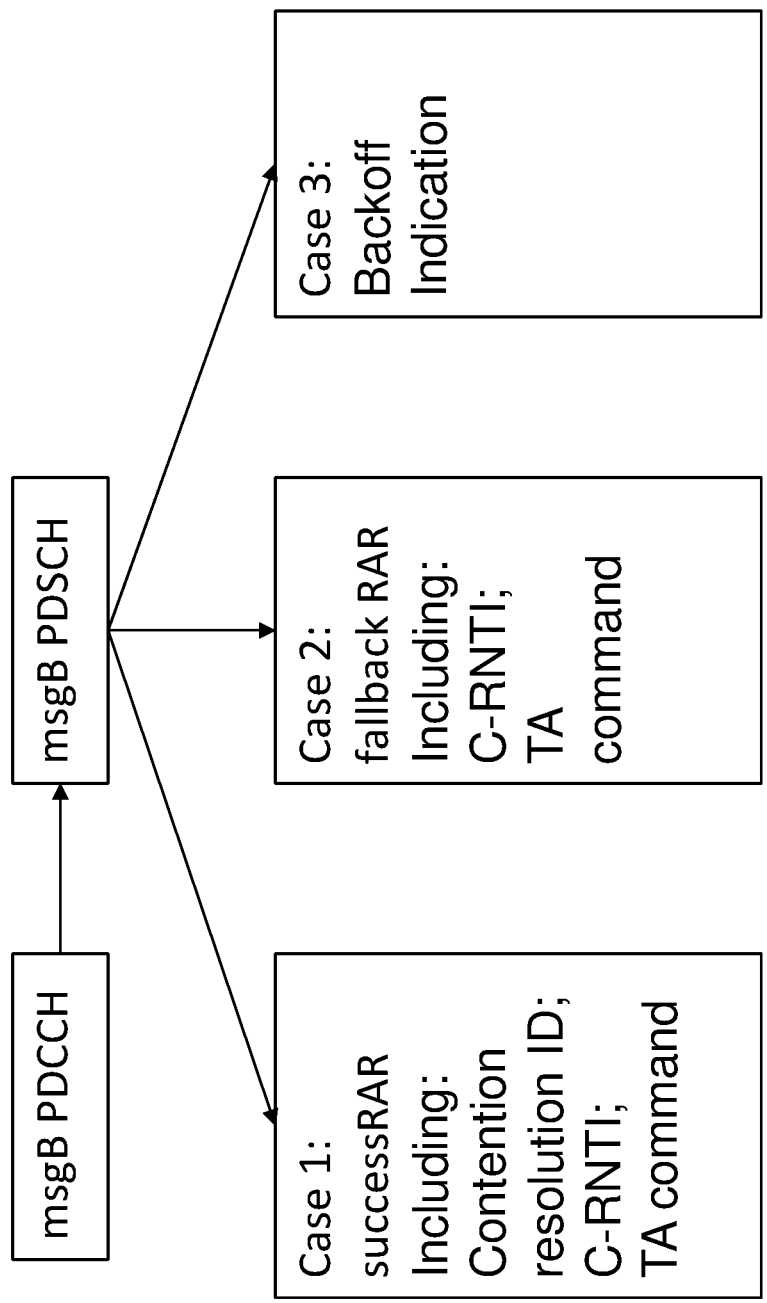
FIG. 2 shows an example of contents of a message transmitted during a 2-step random access procedure.

The contents of the response from gNB i.e. the contents of msgB, in general, may contain one of the three following, also depicted in FIG. 2:
(1) Success response: when both RACH and PUSCH payload are decoded successfully—in this discussion, this response is referred to as successRAR;
(2) Fallback response: When only RACH is decoded but not the payload—in this discussion, this response is referred to as fallbackRAR;
(3) Backoff Indication: Similar as Rel-15, the backoff indication will be used in case no corresponding response (i.e. neither successRAR or fallbackRAR) is received within the MsgB reception window.

The fields that may be included in the successRAR when CCCH message is included in msgA are listed as below:
(1) Contention resolution ID: gNB can obtain the contention resolution ID based on the first 48 bits of the UL CCCH SDU included in the msgA payload—i.e. same as LTE and NR 4-step RACH. The contention resolution ID is for the specific UE to confirm its RACH attempt is accepted by gNB;

(2) C-RNTI: C-RNTI is included in msgB to provide the UE ID in the cell for subsequent usage and this is the unique identification for UE to connect the network;

(3) TA command.

If the C-RNTI is included in the msgA when UE is in RRC_connected state, the fields included in the successRAR in case C-RNTI is included in msgA are different with the above:

(1) C-RNTI: C-RNTI is responsible for the contention resolution function;

(2) timing advance (TA) command.

Upon receiving a "fallback" indication (i.e. fallbackRAR mentioned above), the UE should proceed to msg3 step of 4-step RACH. i.e. the UE shall retransmit the msgA payload in the msg3. This is called the fallback procedure. The rest of the RACH procedure will then follow 4-step RACH procedure.

The fields can be included in the fallbackRAR are RAPID, UL grant (to retransmit the msgA payload), TC-RNTI, TA command.

If the 2-step RACH procedure is for a UE in INACTIVE or IDLE states. The UE includes the CCCH SDU in the MsgA PUSCH part, which has a 48-bit UE Contention Resolution Identity. After successfully receiving the msgA PUSCH part, the gNB sends successRAR in msgB for contention resolution, the contention resolution identity is included in the successRAR in msgB payload carried by PDSCH part of msgB. The PDCCH part of msgB has a CRC which is scrambled with RA-RNTI, here it is called addressed by RA-RNTI, the common RNTI for group UEs shared the same RO. In this case successRARs in msgB for multiple UEs are group cast to multiple UEs who are monitoring the PDCCH addressed with the same RA-RNTI.

UEs are expected to monitor the msgB PDCCH addressed with the RA-RNTI which matches the RACH occasion used by these UEs. When UEs are successfully decoding msgB and getting the successRARs individually matching to themselves, each successRAR corresponds to each UE, these UEs should give HARQ-ACK feedbacks to gNB individually. The matched successRAR includes the matched contention resolution ID or C-RNTI which is included in the UE's msgA payload transmitted as the 2-step RACH attempt. The HARQ-ACK (acknowledging the reception of the matched contention resolution) resource for each UE in group should be unique for gNB to be able to determine which UE received the successRAR message.

As described in the present document, gNB provides 16 common PUCCH resources to be selected in one PUCCH resource set signaled by pucch-ResourceCommon. The PUCCH resource set index corresponds to a PUCCH format, a first symbol, a duration, a PRB offset $RB_{BWP}^{offset}$, and a cyclic shift index set for a PUCCH transmission which can be found in the below Table 1.

TABLE 1

PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |

TABLE 1-continued

PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

In the table, the initial CS indexes is the initial cyclic shift of the sequence carried in one PUCCH symbol. Each cyclic shift in one symbol can represent a resource for PUCCH.

If the UE provides HARQ-ACK information in a PUCCH transmission in response to detecting a DCI format 1_0 or DCI format 1_1, the UE determines a PUCCH resource with index $r_{PUCCH}$, $0 \leq r_{PUCCH} \leq 15$, as $$r_{PUCCH} = \left\lfloor \frac{2 \cdot n_{CCE,0}}{N_{CCE,0}} \right\rfloor + 2 \cdot \Delta_{PRI},$$

where $N_{CCE,0}$ is a number of CCEs in a control resource set of a PDCCH reception conveying the DCI format 1_0 or DCI format 1_1, $n_{CCE,0}$ is the index of a first CCE for the PDCCH reception, and $\Delta_{PRI}$ is a value of the PUCCH resource indicator field which has 3 bits in the DCI format 1_0 or DCI format 1_1.

An example of the PUCCH resource configuration through $r_{PUCCH}$ is shown in FIG. 3. In this example, it is assumed that the PUCCH resource set index=0 and assumed that the bandwidth of bandwidth part (BWP) is 10 PRBs, the 16 PUCCH resource correspondence with index=0 is illuminated in FIG. 3, and r here is $r_{PUCCH}$. The table in FIG. 3 shows the available 16 PUCCH resources and frequency hopping of PUCCH is enabled.

The calculation result of $r_{PUCCH}$ can only determine one PUCCH resource as there is only one index of a first CCE, $n_{CCE,0}$, for the PDCCH reception. This is the bottle neck of configuration for PUCCH resources for group UEs.

For solving the multiple PUCCH resources indication for group UEs, one solution is that the calculation is not based on the index of a first CCE, $n_{CCE,0}$, but based on the UE specific identification known by the gNB and the specific UE together. From the content of successRAR in msgB, the C-RNTI for UE is always included in successRAR in msgB no matter what the C-RNTI is provided in msgB in case CCCH message is included in msgA or the original C-RNTI which is carried in the msgA payload. Due to this, the C-RNTI can be used to determine the $r_{PUCCH}$.

To keep the principal of original equation (currently specified in 3GPP documents) of:

$$r_{PUCCH} = \left\lfloor \frac{2 \cdot n_{CCE,0}}{N_{CCE,0}} \right\rfloor + 2 \cdot \Delta_{PRI} \qquad \text{Equation 1}$$

and the value range of $r_{PUCCH}$ as much, $n_{CCE,0}$ is replaced with the function of C-RNTI which indicated in the matched successRAR in msgB for each UE. This means the PUCCH resource can be indicated or determined by the C-RNTI which indicated in the matched successRAR for each UE. For example, to keep the same $n_{CCE,0}$ value range [0, $N_{CCE,0}-1$], the function can be C-RNTImod $N_{CCE,0}$ or f (C-RNTI)mod $N_{CCE,0}$. Then the $r_{PUCCH}$ will be:

$$r_{PUCCH} = \left\lfloor \frac{2 \cdot [f(C-RNTI) \bmod N_{CCE,0}]}{N_{CCE,0}} \right\rfloor + 2 \cdot \Delta_{PRI} \quad \text{Equation 2}$$

or $$r_{PUCCH} = \left\lfloor \frac{2 \cdot [(C-RNTI) \bmod N_{CCE,0}]}{N_{CCE,0}} \right\rfloor + 2 \cdot \Delta_{PRI}. \quad \text{Equation 3}$$

Here the f is the linear transformation of C-RNTI. Many different transforms are possible, the simplest being an identity transform. Other linear transforms in which C-RNTI is mapped (reversibly) to another number set, may be used for improving, e.g., signaling efficiency.

The $$\left\lfloor \frac{2 \cdot [f(C-RNTI) \bmod N_{CCE,0}]}{N_{CCE,0}} \right\rfloor$$

value dynamic range is [0, 1], it means the different C-RNTIs can only generate two possible results, the randomness is not so good and the PUCCH resource collision rate for the group UEs is still high. A modified solution is proposed to revise the $\Delta_{PRI}$ to [f (C-RNTI)mod($\Delta_{PRI}+1$)]. The dynamic range of [f(C-RNTI)mod ($\Delta_{PRI}+1$)] is larger than the [0, 1], this will further reduce the PUCCH resource collision rate and may reach the 0 collision with the careful C-RNTI configuration by gNB. Then the $r_{PUCCH}$ will be:

$$r_{PUCCH} = \left\lfloor \frac{2 \cdot [f(C-RNTI) \bmod N_{CCE,0}]}{N_{CCE,0}} \right\rfloor + \\ 2 \cdot [f(C-RNTI) \bmod(\Delta_{PRI}+1)] \text{ or} \quad \text{Equation 4}$$

$$r_{PUCCH} = \\ \left\lfloor \frac{2 \cdot [(C-RNTI) \bmod N_{CCE,0}]}{N_{CCE,0}} \right\rfloor + 2 \cdot [(C-RNTI) \bmod(\Delta_{PRI}+1)]. \quad \text{Equation 5}$$

Alternatively, embodiments can only handle the randomness of $\Delta_{PRI}$. Then the $r_{PUCCH}$ will be:

$$r_{PUCCH} = \left\lfloor \frac{2 \cdot n_{CCE,0}}{N_{CCE,0}} \right\rfloor + 2 \cdot [f(C-RNTI) \bmod (\Delta_{PRI}+1)] \text{ or} \quad \text{Equation 6}$$

$$r_{PUCCH} = \left\lfloor \frac{2 \cdot n_{CCE,0}}{N_{CCE,0}} \right\rfloor + 2 \cdot [(C-RNTI) \bmod (\Delta_{PRI}+1)]. \quad \text{Equation 7}$$

This way, the PUCCH resource for each UE in group can be separately indicated and gNB can guarantee the non-overlapping of the PUCCH resources used by grouped UEs via the careful configuration of C-RNTI. In general, the number of UEs in group is not so much, 2 or 3 is estimated as the upper limit depending on the gNB detecting capability for multiple preambles shared in the same RO. So the selection of C-RNTI is not difficult for gNB.

Regarding the traditional 4-step RACH UE is still uses the $$r_{PUCCH} = \left\lfloor \frac{2 \cdot n_{CCE,0}}{N_{CCE,0}} \right\rfloor + 2 \cdot \Delta_{PRI}$$

to determine the PUCCH resource, to avoid the collision of PUCCH resource used by 2-step and 4-step RACH, gNB can configure different $\Delta_{PRI}$ to different type of RACH, for example, gNB configure the lower $\Delta_{PRI}$ to 2-step RACH and configure the higher $\Delta_{PRI}$ to 4-step RACH.

In a traditional procedure in which PUCCH carries the HARQ-ACK, if a UE transmits HARQ-ACK information using PUCCH format 0, the UE determines values $m_0$ and $m_{CS}$ for computing a value of cyclic shift where $m_0$ is provided by higher layer parameter initialCyclicShift of PUCCH-format0, and $m_{CS}$ is determined from the value of one HARQ-ACK information bit or from the values of two HARQ-ACK information bits as in next two tables, respectively. Here the $m_{CS}$ is an additional cyclic shift based on the initial cyclic shift of the sequence.

TABLE 2

Mapping of values for one HARQ-ACK information bit to sequences for PUCCH format 0

| HARQ-ACK Value | 0 | 1 |
|---|---|---|
| Sequence cyclic shift | $m_{CS} = 0$ | $m_{CS} = 6$ |

TABLE 3

Mapping of values for two HARQ-ACK information bits to sequences for PUCCH format 0

| HARQ-ACK Value | {0, 0} | {0, 1} | {1, 1} | {1, 0} |
|---|---|---|---|---|
| Sequence cyclic shift | $m_{CS} = 0$ | $m_{CS} = 3$ | $m_{CS} = 6$ | $m_{CS} = 9$ |

Figure 4:
FIG. 4 shows another example of transmission resource assignment.

Actually, if a UE transmits HARQ-ACK information using PUCCH format 0, for HARQ-ACK feedback to msgB, the NACK which the HARQ-ACK value equals 0 is not needed in the case of 2-step RACH, and only ACK which the HARQ-ACK value equals 1 is really needed. So the unused $m_{CS}=0$ can be re-farmed as the new additional PUCCH resource. That means the number of common PUCCH resources can be enlarged from 16 to 32, as illustrated in FIG. 4. The determination of $r_{PUCCH}$ can be modified to:

$$r_{PUCCH} = \left\lfloor \frac{4 \cdot [f(C-RNTI) \bmod N_{CCE,0}]}{N_{CCE,0}} \right\rfloor + 4 \cdot \Delta_{PRI}, \quad \text{Equation (8)}$$

and the value scope will be changed to $0 \leq r_{PUCCH} \leq 31$. In the same way, the revision from $\Delta_{PRI}$ to [f (C-RNTI)mod($\Delta_{PRI}+1$)] can also applied to the equation.

One concept of the example 1 is that: some parameters to determine the PUCCH resource just like $\Delta_{PRI}$, $n_{CCE,0}$ are from the msgB DCI addressed with the RA-RNTI which is common to group UEs, but the C-RNTI is from the RAR in msgB for specific UE.

Example Embodiment 2

Except the parameters to determine the PUCCH resource are in msgB DCI for all the UE, the parameter PDSCH-to- HARQ_feedback timing indicator might be included in the successRARs in one msgB for the dedicated UE. Then the PUCCH resources for the group UE will be separated in different slots.

Example Embodiment 3

Except the parameters to determine the PUCCH resource are in msgB DCI for all the UE, the parameter PUCCH resource indicator field $\Delta_{PRI}$ might be included in the successRARs in one msgB for the dedicated UE. Then the PUCCH resources for the group UE will be separated by different $\Delta_{PRI}$.

In general, the above example embodiments can be summarized as the below:

The parameters to determine the PUCCH resource for 2-step RACH can be separated into two parts: a common part and a dedicated part. The common part parameter can be included in DCI for all the UEs in group. And dedicated part parameters can be included in subMAC PDUs or successRARs in one msgB for the dedicated UE.

Figure 5:
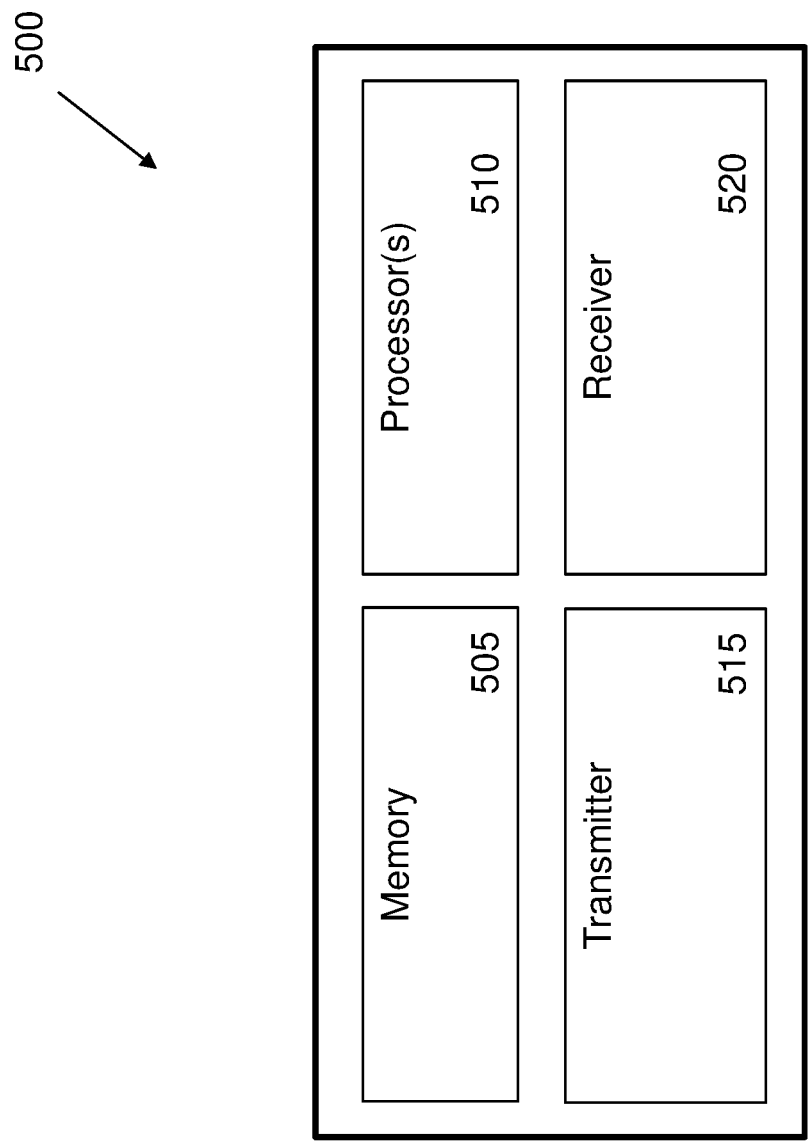
FIG. 5 is a block diagram of an example of a hardware platform for implementing one or more methods described in the present document.

FIG. 5 shows an exemplary block diagram of a hardware platform 500 that may be a part of a network device (e.g., base station or gNB) or a wireless device (e.g., a UE). A network node can be referred to as a first device and a terminal can be referred to as a second device. The hardware platform 500 includes at least one processor 510 and a memory 505 having instructions stored thereupon. The instructions upon execution by the processor 510 configure the hardware platform 500 to perform the operations described in FIGS. 1 to 5 and/or 7 and in the various embodiments described in this patent document. The transmitter 515 transmits or sends information or data to another node. For example, a network node transmitter can send a message to a user equipment. The receiver 520 receives information or data transmitted or sent by another node. For example, a user equipment can receive a message from a network node.

Referring again to the methods 500, 600 and 700, various embodiments described herein disclose that the resource index may be $r_{PUCCH}$, as described herein. Referring to methods 600, 700 and 800, in some embodiments, the temporary identifier corresponds to a cell radio network temporary identifier (C-RNTI) and wherein the message includes the temporary identifier in a successRAR field. In some embodiments, the resource index may be calculated as shown in Equation 2 to 3. In some embodiments, resource index may be calculated as shown in Equation 4 to 7. Here, $N_{CCE,0}$ may represent a number of control channel elements in a control resource set of a control channel transmission received from the network device to the wireless device, and $\Delta_{PRI}$ represents a value of an indicator field for the transmission resource from the wireless device to the network device, as described herein.

It will be appreciated that several techniques for improving the performance of the 2-step random access procedure are disclosed. In one aspect, UE-specific transmission resources for transmission of uplink acknowledgements from the UE can be signaled in embodiments that use the disclosed techniques.

In some embodiments, the transmission resource is for a physical control channel from the communication device to the network device. In some embodiments, common parameter is included in the message corresponds to a system information message in a master information block or a system information block transmission from the network device to the wireless device. In some embodiments, common parameters are included in the message in a control transmission from the network device to the wireless device in an explicit mode. In some embodiments, common parameters are included in the message in a control transmission from the network device to the wireless device in an implicit mode. In some embodiments, the dedicated parameter includes a hybrid automatic repeat request feedback time resource indication. In some embodiments, the dedicated parameter includes a resource indication field for a physical uplink control channel. In some embodiments, the dedicated parameter is included in a successRAR message (e.g., as shown in FIG. 2).

In some embodiments, a wireless communication apparatus, e.g., as described with respect to FIG. 5, may be used to implement a technique or solution disclosed herein. In some embodiments, a computer-readable may store code for implementing a disclosed method by a processor. In the context of the processor implementation, the terms "receiving" and "transmitting" may mean that the processor controls reception or transmission circuitry to cause reception or transmission of a waveform or a message or a transmission as described.

It will further be appreciated that the following technical solutions may be used:

Solution 1: UE monitors the msgB PDCCH addressed with the RA-RNTI which matches the RACH occasion used by this UE; the UE in the group of UEs shared the same RACH occasion decodes the successRARs multiplexed in msgB and successfully finds the matched contention resolution identity or C-RNTI; UE feedbacks the ACK to gNB in the indicated PUCCH resource, wherein the PUCCH resource is determined by the C-RNTI which is included in the matched successRAR in msgB for the UE.

Solution 2: Solution according to solution 1, wherein the PUCCH resource with index r_PUCCH is determined by the function of C-RNTI which included in the matched successRAR in msgB for the UE.

Solution 3: Solution according to solution 1, wherein in case that a UE transmits HARQ-ACK information using PUCCH format 0, m_CS, the value of cyclic shift, which represents the HARQ-ACK value equals 0 is re-farmed as the PUCCH resource.

Solution 4: Solution according to solution 1 or 2, wherein the index r_PUCCH is determined using equations 2 or 3 described herein.

Solution 5: Solution according to solution 1 or 2, wherein the index r_PUCCH is determined using the equations 4 or 5 described herein.

Solution 6: Solution according to solution 2 or 3, wherein the index r_PUCCH is determined using the equations 6 or 7 described herein.

Solution 7: Solution according to solutions 2 or 3 described herein, wherein the index r_PUCCH is computed using equations described herein.

Solution 8: The gNB detects the preamble in msgA and decodes the payload in PUSCH of msgA which is sent by UE; the gNB sends successRAR in msgB for contention resolution, the contention resolution identity is included in the successRAR in msgB payload carried by PDSCH part of msgB and the PDCCH part of msgB which is scrambled with RA-RNTI, wherein, multiple successRARs for multiple UEs are multiplexed in one MAC PDU in msgB and group cast to multiple UEs who are monitoring the PDCCH addressed with the same RA-RNTI; the gNB monitors the acknowledge on the indicated PUCCH resources from the UE which successfully finds the matched successRAR in msgB, wherein, the PUCCH resource is determined by the C-RNTI which is included in the matched successRAR in msgB for the UE.

Solution 9: The gNB side solutions make use of equations and other features as described with respect to Solutions 2 to 7.

Solution 10: UE feedbacks the ACK to gNB in the indicated PUCCH resource, wherein the PUCCH resource is determined by common parameters for all UEs in the group, and dedicated parameters for the specific UE. The dedicated parameter(s) is included in the successRAR in msgB.

Solution 11: A solution according to solution 10, wherein the common parameters are included in DCI in explicit or implicit mode. Or, are included in the system information.

Solution 12: A solution according to solution 10, the dedicated parameters are HARQ feedback time resource indication or PUCCH resource indicator field.

In some embodiments, a network device might implement a method of wireless that includes transmitting, by a network device, during a process of a two-step random access to a wireless network, a message including a common parameter for a group of communication devices and a dedicated parameter for a communication device and receiving, by the network device, an acknowledgement message from the communication device using a transmission resource that is dependent on the common parameter and the dedicated parameter. Additional features of this method may be as described with respect to the method 800.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
   receiving, by a communication device, during a process of a two-step random access to a wireless network, a message including a temporary identifier assigned to the communication device; and
   transmitting, by the communication device, an acknowledgement message to a network device in the wireless network using a transmission resource that is dependent on the temporary identifier,
   wherein a resource index of the transmission resource is determined by a function of the temporary identifier,
   wherein the resource index, denoted as $r_{PUCCH}$, is determined from the temporary identifier, denoted as C-RNTI, using:

$$r_{PUCCH} = \left\lfloor \frac{2 \cdot [f(C-RNTI) \bmod N_{CCE,0}]}{N_{CCE,0}} \right\rfloor + 2[f(C-RNTI) \bmod (\Delta_{PRI} + 1)]$$

where $N_{CCE,0}$ represents a number of control channel elements in a control resource set of a control channel transmission received from the network device by the communication device, and $\Delta_{PRI}$ represents a value of an indicator field for the transmission resource from the communication device to the network device.

2. The method of claim 1, wherein the transmission resource corresponds to a physical uplink channel (PUCCH) resource.

3. The method of claim 1, wherein the message includes the temporary identifier in a successRAR field.

4. A method of wireless communication, comprising:
   receiving, by a communication device, during a process of a two-step random access to a wireless network, a message including a temporary identifier assigned to the communication device; and transmitting, by the communication device, an acknowledgement message to a network device in the wireless network using a transmission resource that is dependent on the temporary identifier, wherein a resource index of the transmission resource is determined by a function of the temporary identifier, wherein the resource index, denoted as $r_{PUCCH}$, is determined from the temporary identifier, denoted as C-RNTI, using:

$$r_{PUCCH} = \left\lfloor \frac{2 \cdot [(C-RNTI) \bmod N_{CCE,0}]}{N_{CCE,0}} \right\rfloor + 2 \cdot [(C-RNTI) \bmod (\Delta_{PRI} + 1)];$$

where $N_{CCE,0}$ represents a number of control channel elements in a control resource set of a control channel transmission received from the network device by the communication device, and $\Delta_{PRI}$ represents a value of an indicator field for the transmission resource from the communication device to the network device.

5. The method of claim 4, wherein the transmission resource corresponds to a physical uplink channel (PUCCH) resource.

6. The method of claim 4, wherein the message includes the temporary identifier in a successRAR field.

7. A method of wireless communication, comprising:

transmitting, by a network device, during a process of a two-step random access by a communication device to a wireless network, a message including a temporary identifier assigned to the communication device; and receiving, by the network device, an acknowledgement message from the communication device on a transmission resource that is dependent on the temporary identifier, wherein a resource index of the transmission resource is determined by a function of the temporary identifier, wherein the resource index, denoted as $r_{PUCCH}$, is determined from the temporary identifier, denoted as C-RNTI, using:

$$r_{PUCCH} = \left\lfloor \frac{2 \cdot [f(C-RNTI) \bmod N_{CCE,0}]}{N_{CCE,0}} \right\rfloor + 2[f(C-RNTI) \bmod (\Delta_{PRI} + 1)]$$

where $N_{CCE,0}$ represents a number of control channel elements in a control resource set of a control channel transmission transmitted by the network device to the communication device, and $\Delta_{PRI}$ represents a value of an indicator field for the transmission resource from the communication device to the network device.

8. The method of claim 7, wherein the transmission resource corresponds to a physical uplink channel (PUCCH) resource.

9. The method of claim 7, wherein the message includes the temporary identifier in a successRAR field.

10. A method of wireless communication, comprising:

transmitting, by a network device, during a process of a two-step random access by a communication device to a wireless network, a message including a temporary identifier assigned to the communication device; and receiving, by the network device, an acknowledgement message from the communication device on a transmission resource that is dependent on the temporary identifier, wherein a resource index of the transmission resource is determined by a function of the temporary identifier, wherein the resource index, denoted as $r_{PUCCH}$, is determined from the temporary identifier, denoted as C-RNTI, using:

$$r_{PUCCH} = \left\lfloor \frac{2 \cdot [(C-RNTI) \bmod N_{CCE,0}]}{N_{CCE,0}} \right\rfloor + 2 \cdot [(C-RNTI) \bmod (\Delta_{PRI} + 1)];$$

where $N_{CCE,0}$ represents a number of control channel elements in a control resource set of a control channel transmission transmitted by the network device to the communication device, and $\Delta_{PRI}$ represents a value of an indicator field for the transmission resource from the communication device to the network device.

11. The method of claim 10, wherein the transmission resource corresponds to a physical uplink channel (PUCCH) resource.

12. The method of claim 10, wherein the message includes the temporary identifier in a successRAR field.

13. A wireless communication apparatus comprising a memory storing instructions and a processor configured to execute the instructions to:

receive, during a process of a two-step random access to a wireless network, a message including a temporary identifier assigned to the wireless communication apparatus; and transmit an acknowledgement message to a network device in the wireless network using a transmission resource that is dependent on the temporary identifier, wherein a resource index of the transmission resource is determined by a function of the temporary identifier, wherein the resource index, denoted as $r_{PUCCH}$, is determined from the temporary identifier, denoted as C-RNTI, using:

$$r_{PUCCH} = \left\lfloor \frac{2 \cdot [f(C-RNTI) \bmod N_{CCE,0}]}{N_{CCE,0}} \right\rfloor + 2[f(C-RNTI) \bmod (\Delta_{PRI} + 1)]$$

where $N_{CCE,0}$ represents a number of control channel elements in a control resource set of a control channel transmission received from the network device by the wireless communication apparatus, and $\Delta_{PRI}$ represents a value of an indicator field for the transmission resource from the wireless communication apparatus to the network device.

14. The wireless communication apparatus of claim 13, wherein the transmission resource corresponds to a physical uplink channel (PUCCH) resource.

15. The wireless communication apparatus of claim 13, wherein the message includes the temporary identifier in a successRAR field.

16. A network apparatus comprising a memory storing instructions and a processor configured to execute the instructions to:

transmit, during a process of a two-step random access by a communication device to a wireless network, a message including a temporary identifier assigned to the communication device; and receive an acknowledgement message from the communication device on a transmission resource that is dependent on the temporary identifier, wherein a resource index of the transmission resource is determined by a function of the temporary identifier, wherein the resource index, denoted as $r_{PUCCH}$, is determined from the temporary identifier, denoted as C-RNTI, using:

$$r_{PUCCH} = \left\lfloor \frac{2 \cdot [f(C-RNTI) \bmod N_{CCE,0}]}{N_{CCE,0}} \right\rfloor + 2[f(C-RNTI) \bmod (\Delta_{PRI} + 1)]$$

where $N_{CCE,0}$ represents a number of control channel elements in a control resource set of a control channel transmission transmitted by the network apparatus to the communication device, and $\Delta_{PRI}$ represents a value of an indicator field for the transmission resource from the communication device to the network apparatus.

17. The network apparatus of claim 16, wherein the transmission resource corresponds to a physical uplink channel (PUCCH) resource.

18. The network apparatus of claim 16, wherein the message includes the temporary identifier in a successRAR field.

19. A wireless communication apparatus comprising a memory storing instructions and a processor configured to execute the instructions to:

receive, during a process of a two-step random access to a wireless network, a message including a temporary identifier assigned to the wireless communication apparatus; and transmit an acknowledgement message to a network device in the wireless network using a transmission resource that is dependent on the temporary identifier, wherein a resource index of the transmission resource is determined by a function of the temporary identifier, wherein the resource index, denoted as $r_{PUCCH}$, is determined from the temporary identifier, denoted as C-RNTI, using:

$$r_{PUCCH} = \left\lfloor \frac{2 \cdot [(C-RNTI) \bmod N_{CCE,0}]}{N_{CCE,0}} \right\rfloor + 2 \cdot [(C-RNTI) \bmod (\Delta_{PRI} + 1)];$$

where $N_{CCE,0}$ represents a number of control channel elements in a control resource set of a control channel transmission received from the network device by the wireless communication apparatus, and $\Delta_{PRI}$ represents a value of an indicator field for the transmission resource from the wireless communication apparatus to the network device.

20. The wireless communication apparatus of claim 19, wherein the transmission resource corresponds to a physical uplink channel (PUCCH) resource.

21. The wireless communication apparatus of claim 19, wherein the message includes the temporary identifier in a successRAR field.

22. A network apparatus comprising a memory storing instructions and a processor configured to execute the instructions to:

transmit, during a process of a two-step random access by a communication device to a wireless network, a message including a temporary identifier assigned to the communication device; and receive an acknowledgement message from the communication device on a transmission resource that is dependent on the temporary identifier, wherein a resource index of the transmission resource is determined by a function of the temporary identifier, wherein the resource index, denoted as $r_{PUCCH}$, is determined from the temporary identifier, denoted as C-RNTI, using:

$$r_{PUCCH} = \left\lfloor \frac{2 \cdot [(C-RNTI) \bmod N_{CCE,0}]}{N_{CCE,0}} \right\rfloor + 2 \cdot [(C-RNTI) \bmod (\Delta_{PRI} + 1)];$$

where $N_{CCE,0}$ represents a number of control channel elements in a control resource set of a control channel transmission transmitted by the network apparatus to the communication device, and $\Delta_{PRI}$ represents a value of an indicator field for the transmission resource from the communication device to the network apparatus.

23. The network apparatus of claim 22, wherein the transmission resource corresponds to a physical uplink channel (PUCCH) resource.

24. The network apparatus of claim 22, wherein the message includes the temporary identifier in a successRAR field.

* * * * *